United States Patent [19]

Miyamoto et al.

[11] 4,410,690

[45] Oct. 18, 1983

[54] PROCESS FOR PREPARATION OF MODIFIED AROMATIC HYDROCARBON RESIN

[75] Inventors: Akira Miyamoto, Hiratsuka; Katsuo Sato; Toshiaki Nishimura, both of Kanagawa; Yoshitaka Yamagishi; Yoshimasa Mitui, both of Hiratsuka, all of Japan

[73] Assignee: Mitsubishi Gas Chemical Co., Inc., Tokyo, Japan

[21] Appl. No.: 373,693

[22] Filed: Apr. 30, 1982

[30] Foreign Application Priority Data

May 7, 1981 [JP] Japan ................................ 56-68651

[51] Int. Cl.$^3$ .............................................. C08G 2/28
[52] U.S. Cl. .................................... 528/486; 525/400; 525/401; 528/247; 528/495; 528/499; 528/500
[58] Field of Search ............... 528/232, 247, 483, 486, 528/495, 499, 500, 230; 525/400, 401

[56] References Cited

U.S. PATENT DOCUMENTS

| | | |
|---|---|---|
| 2,806,834 | 9/1957 | Nischk et al. ........................ 528/247 |
| 2,985,615 | 5/1961 | Tunteler et al. ..................... 528/242 |
| 3,481,892 | 12/1969 | Huang et al. ........................ 528/247 |
| 3,539,534 | 11/1970 | Manganaro et al. ................. 528/232 |

Primary Examiner—Lucille M. Phynes
Attorney, Agent, or Firm—Armstrong, Nikaido, Marmelstein & Kubovcik

[57] ABSTRACT

A process for the preparation of a modified aromatic hydrocarbon resin which comprises reacting an aromatic hydrocarbon-formaldehyde resin with an unsaturated polybasic acid or an anhydride thereof, together with a saturated polybasic acid or an anhydride thereof if necessary, in the presence or absence of water, while introducing steam into the reaction system to remove by-produced formaldehyde out of the reaction system, and reacting the formed reaction product with at least one dihydroxy compound selected from the group consisting of (A) a glycol and (B) a hydroxy-terminated oligomer obtained by reacting a glycol with an unsaturated polybasic acid or an anhydride thereof; the cured product of the modified aromatic hydrocarbon resin being excellent in mechanical strength and resistance to water and alkalis.

12 Claims, No Drawings

PROCESS FOR PREPARATION OF MODIFIED AROMATIC HYDROCARBON RESIN

This invention relates to a process for producing a modified aromatic hydrocarbon resin which comprises reacting an aromatic hydrocarbon-formaldehyde resin with an unsaturated polybasic acid or anhydride thereof and, if desired, also with a saturated polybasic acid or anhydride thereof, in the presence or absence of water, while removing the formed formaldehyde out of the reaction system by introducing steam into the system through the reaction, and then reacting the resulting product with at least one dihydroxy compound selected from the group consisting of (A) a glycol and (B) a hydroxy-terminated oligomer obtained by reacting a glycol with an unsaturated polybasic acid or anhydride thereof.

There have already been known techniques of adding a glycol to the system for reacting an aromatic hydrocarbon-formaldehyde resin with a carboxylic acid (Japanese Patent Application Kokai (Laid-Open) No. 85686/1973 and Japanese Patent Publication No. 39821/1975). According to these methods, however, since the glycol, the saturated dibasic acid, and the aromatic hydrocarbon-formaldehyde resin are reacted simultaneously or an unsaturated polyester resin, the glycol and the aromatic hydrocarbon-formaldehyde resin are reacted simultaneously, the formaldehyde produced by the reaction of the carboxylic acid with the aromatic hydrocarbon-formaldehyde resin reacts with the glycol to form dioxolane, which is distilled out of the reaction system, resulting in loss of the glycol.

The present inventors proceeded with investigations for a process for producing a modified aromatic hydrocarbon resin suitable for use as an unsaturated polyester resin, wherein said loss of glycol is prevented as well, and as a result, have accomplished the present invention.

The present inventors previously found out a process for producing a modified aromatic hydrocarbon resin suitable for use as an unsaturated polyester which comprises reacting an aromatic hydrocarbon-formaldehyde resin with an unsaturated polybasic acid or anhydride thereof in the presence or absence of water while removing the formed formaldehyde out of the reaction system by introducing steam into the system. This modified aromatic hydrocarbon resin can be made, like usual unsaturated polyesters, into an unsaturated polyester resin by dissolving it in a crosslinking polymerizable monomer such as styrene, vinyltoluene, or diallyl phthalate. In this case, it is possible to synthesize a modified aromatic hydrocarbon resin having performance characteristics necessary for a general purpose unsaturated polyester resin, by reacting 10 to 40 parts, preferably 20 to 30 parts, by weight of maleic anhydride with 100 parts by weight of an aromatic hydrocarbon-formaldehyde resin. For obtaining a more reactive unsaturated polyester resin, the charge of an unsaturated polybasic acid such as maleic anhydride may be increased; however, charges of maleic anhydride in an amount of more than 40 parts per 100 parts of the aromatic hydrocarbon-formaldehyde resin, by weight, may result in increased amounts of maleic anhydride in the product depending upon the carboxylic acid-consuming capacity of the aromatic hydrocarbon-formaldehyde resin; thus, sometimes an unsaturated polyester resin having very high acid value will be produced. In this case, such a modified aromatic hydrocarbon resin can be transformed into a usual unsaturated polyester resin by adding a glycol such as propylene glycol to react with the excess carboxylic acid.

This invention provides a process for producing a modified aromatic hydrocarbon resin (hereinafter, referred to simply as "modified resin") having a controlled acid value, particularly suited for a general purpose unsaturated polyester resin by modifying first an aromatic hydrocarbon-formaldehyde resin with an unsaturated polybasic acid or anhydride thereof and further modifying it with glycols.

Thus, the present invention involves a process for producing said modified resin comprising reacting an aromatic hydrocarbon-formaldehyde resin with an unsaturated polybasic acid or anhydride thereof and, if necessary, also with a saturated polybasic acid or anhydride thereof in the presence or absence of water while introducing steam into the reaction system to remove by-produced formaldehyde out of the reaction system, followed by reacting the formed reaction product with at least one dihydroxy compound of the following components (A) and (B):

(A) a glycol and
(B) a hydroxy-terminated oligomer obtained by reacting a glycol with an unsaturated polybasic acid or anhydride thereof.

According to the process of the present invention the desired modified resin free from objectional by-products due to formaldehyde and glycols can be obtained because, the reaction product obtained by reacting the aromatic hydrocarbon-formaldehyde with the unsaturated polybasic acid or anhydride thereof (hereinafter, this reaction may be referred to as the first stage reaction) and removing the by-produced formaldehyde substantially out of the reaction mixture is used in the reaction of that with at least one dihydroxy compound of the components (A) or (B) (hereinafter, this reaction may be referred to as the second stage reaction).

The aromatic hydrocarbon-formaldehyde resin used in this invention is a known one obtainable by reacting an aromatic hydrocarbon such as xylene, mesitylene, toluene or benzene, with formaldehyde in the presence of sulfuric acid or some other acid catalyst. Unsaturated polybasic acids or anhydrides thereof suitable for use in this invention include maleic anhydride, maleic acid, fumaric acid and itaconic acid. Saturated polybasic acids or anhydrides thereof suitable for the additional charge are those in use for the production of usual unsaturated polyester resins, such as, for example, adipic acid, sebacic acid, phthalic anhydride, isophthalic acid, and terephthalic acid.

In practising the process of this invention, steam is introduced into the reaction system; the amount of steam used may be selected from the range of 1 to 100 parts, preferably 5 to 30 parts, by weight per 100 parts by weight of the aromatic hydrocarbon-formaldehyde resin. Steam may be introduced either continuously or intermittently in a constant or varied amount during the period from the start of the first stage reaction to its end. It is desirable to stop the introduction of steam as soon as possible when the formation of formaldehyde substantially has finished. In the process of this invention, water may also be present in the reaction system; the amount of water present is up to 50 parts, preferably up to 30 parts, by weight per 100 parts by weight of the aromatic hydrocarbon-formaldehyde resin. Water may be suitably added to the reaction system, either all at once or in parts as the reaction proceeds.

When the process of this invention is practised, the amount ratio of the unsaturated polybasic acid or anhydride thereof to the aromatic hydrocarbon-formaldehyde resin may be chosen according to those accepted in the hitherto known processes, for instance, in consideration of the oxygen content in said resin; for example, the ratio is within the range of 10 to 40 parts by weight of the unsaturated polybasic acid or anhydride thereof per 100 parts by weight of the aromatic hydrocarbon-formaldehyde resin.

When the ratio is below the lower limit above-mentioned, the modification of the aromatic hydrocarbon-formaldehyde resin is insufficient and results in some troubles in the second stage reaction. On the other hand, when the ratio exceeds the upper limit, there is a fear of gelation caused during the first stage reaction.

The product of the first stage reaction, based on the process of this invention, is then converted by the second stage reaction, i.e. the reaction with a glycol, into a desired modified resin of which the acid value has been suitably controlled as desired. This makes possible arbitrary productions of various qualities of unsaturated polyester resins, thus having great significance in practical applications. Typical glycols used herein include ethylene glycol; propylene glycol; polyalkylene glycol such as diethylene glycol, dipropylene glycol, polyethylene glycol and polypropylene glycol; neopentyl glycol; 1,6-hexanediol; and 2,2-bis(4-hydroxypropoxyphenyl)propane; that is, they may be commonly used in the production of usual unsaturated polyester resins. The amount of the glycol used is chosen so that the equivalence ratio of the hydroxyl groups containing in the dihydroxy compound to be added versus the carboxyl groups containing in the first stage reaction product, i.e. the ratio (—OH/—COOH), may become within the range of 0.5 to 1.5, the quantity of said carboxyl groups being calculated by measuring the acid value of the first stage reaction product. Said equivalence ratio, if exceeding 1.5, causes a poor water resistance of the end product, the cured unsaturated polyester resin.

An embodiment of the modification with a glycol in the process of this invention is to use part of said unsaturated polybasic acid or anhydride thereof in combination with the glycol.

It is also possible as an alteration of this embodiment to use the glycol in a form of a hydroxy-terminated oligoester having a molecular weight of less than 1000 produced by reacting the glycol with part of said unsaturated polybasic acid or anhydride thereof. In these embodiments, amounts of the unsaturated polybasic acid or anhydride thereof and of the glycol are each selected within the above-defined range.

The first stage reaction, in this invention, is conducted at temperatures of at least 100° C., and the temperature is raised up to around 200° C. as the removal of formaldehyde proceeds with the introduction of steam. The second stage reaction is carried out usually at temperatures of 180° to 250° C. For carrying out these reactions, a known polymerization inhibitor may be added to the reaction system or an inert gas atmosphere may be used to cover the reaction system as in the production of usual unsaturated polyester resins.

The modified resin produced by the process of this invention is converted into an unsaturated polyester resin by dissolving in a crosslinking monomer such as styrene, vinyltoluene, or diallyl phthalate. Like usual unsaturated polyester resins the unsaturated polyester resin obtained by the present invention can be cured with ease by incorporating thereinto an organic peroxide as a catalyst, such as benzoyl peroxide, methyl ethyl ketone peroxide, or di-tert-butyl peroxide, and if necessary, also a hardening accelerator such as cobalt naphthenate, cobalt octoate, or dimethylaniline.

Curing characteristics of this unsaturated polyester resin differ in no respect from those of usual unsaturated polyester resins. Its cured products are excellent in chemical resistances, particularly in water resistance and alkali resistance, and further in adhesion and electrical characteristics, being applicable for various purposes such as for anticorrosive FRP (fiber-reinforced plastics), gel coats, and molding compounds such as a sheet molding compound and a bulk molding compound.

The present invention will be illustrated in more detail by the following Examples and Comparative Examples: Hereinafter, the terms "part" and "%" are based on weight unless otherwise noted.

COMPARATIVE EXAMPLE 1

A mixture of a xylene-formaldehyde resin (100 parts), maleic anhydride (25 parts), and water (10 parts) was fed into a reactor equipped with a stirrer, thermometer, reflux condenser, and fractionator, and heated under reflux at 105° C. with stirring to react for 1 hour. While blowing steam through the reaction mixture at the rate of 5 parts/hr to distill the produced formaldehyde off in the form of aqueous solution, the temperature of the mixture was raised up to 200° C. spending 1.5 hours. Further, the mixture was reacted at 200° C. for 3 hours, then the steam blowing was stopped, and the reaction was continued for further 1 hour under a stream of nitrogen, thus giving a modified resin (117 parts) having an acid value of 28. The resin obtained was dissolved in styrene (50 parts) containing hydroquinone (0.015 part). This solution is designated as "resin (A)".

COMPARATIVE EXAMPLE 2

A modified resin (126 parts) having acid value of 54 was obtained by reacting a mixture of a xylene-formaldehyde resin (100 parts), maleic anhydride (38 parts) and water in the same manner as in Comparative Example 1. The resin obtained was dissolved in styrene (54 parts) containing hydroquinone (0.016 part). This solution is designated as "resin (B)".

REFERENCE EXAMPLES 1

A propylene glycol-fumaric acid oligomer (228 parts) having hydroxyl value of 450 was obtained by reacting propylene glycol (152 parts, 2 moles) and fumaric acid (116 parts, 1 mole) in a reactor equipped with a stirrer, thermometer, reflux condenser, and fractionator under a stream of nitrogen at 170° C. for 3 hours, 180° C. for 1 hour, 190° C. for 1 hour, 200° C. for 1 hour, and 210° C. for 3 hours, successively.

EXAMPLE 1

A mixture of a xylene-formaldehyde resin (100 parts), maleic anhydride (38 parts), and water (10 parts) was fed into a reactor equipped with a stirrer, thermometer, reflux condenser, and fractionator, and heated under reflux at 105° C. with stirring to react for 30 minutes. While blowing steam through the reaction mixture at the rate of 5 parts/hr to distill the produced formaldehyde off in the form of aqueous solution, the mixture is reacted at 130° C. for 2 hours and its temperature was then raised to 200° C. spending 1.5 hours. After the reaction was continued at 200° C. for 1 hour, the steam blowing was stopped. Propylene glycol (20 parts) was then added and reacted with the resulting product at 200° C. for 4 hours under a stream of nitrogen. Thus, a modified resin (142 parts) having acid value of 25 was obtained. The resin obtained was dissolved in styrene (95 parts) containing hydroquinone (0.022 part). This solution is designated as "resin (C)".

EXAMPLE 2

The first stage reaction of a xylene-formaldehyde resin (100 parts) was carried out by adding maleic anhydride (38 parts) and water (10 parts), in the same manner as in Example 1. Then, maleic anhydride (188 parts) and propylene glycol (285 parts) were added to the resulting mixture and reacted therewith at 200° C. for 5 hours under a stream of nitrogen. Thus, a modified resin (556 parts) having acid value of 26 was obtained, which was then dissolved in styrene (370 parts) containing hydroquinone (0.07 part). This solution is designated as "resin (D)".

EXAMPLE 3

The first stage reaction of a xylene-formaldehyde resin (100 parts) was carried out by adding maleic anhydride (38 parts) and water (10 parts), in the same manner as in Example 1. Then, fumaric acid (52 parts) and propylene glycol (76 parts) were added to the resulting mixture and reacted therewith at 200° C. for 4 hours under a stream of nitrogen. Thus, a modified resin (239 parts) having acid value of 28 was obtained, which was then dissolved in styrene (159 parts) containing hydroquinone (0.022 part). This solution is designated as "resin (E)".

EXAMPLE 4

The first stage reaction of a xylene-formaldehyde resin (100 parts) with maleic anhydride (38 parts) was carried out without adding water in the same manner as in Example 1. Then, the oligomer (116 parts) synthesized from propylene glycol and fumaric acid in Reference Example 1 was added to the resulting mixture and reacted therewith at 200° C. for 4 hours under a stream of nitrogen. Thus, a modified resin (226 parts) having acid value of 22 was obtained, which was then dissolved in styrene (152 parts) containing hydroquinone (0.022 part). This solution is designated as "resin (F)".

EXAMPLE 5

The first stage reaction of a xylene-formaldehyde resin (100 parts) was carried out by adding maleic anhydride (38 parts) and water (10 parts), in the same manner as in Example 1. Then, maleic anhydride (188 parts) and ethylene glycol (223 parts) were added to the resulting mixture and reacted therewith at 200° C. for 5 hours under a stream of nitrogen. Thus, a modified resin (500 parts) having acid value of 25 was obtained, which was then dissolved in styrene (333 parts) containing hydroquinone (0.066 part). This solution is designated as "resin (G)".

EXAMPLE 6

The first stage reaction of a xylene-formaldehyde resin (100 parts) was carried out by adding maleic anhydride (38 parts) and water (10 parts), in the same manner as in Example 1. Then, maleic anhydride (188 parts) and diethylene glycol (398 parts) were added to the resulting mixture and reacted therewith at 200° C. for 5 hours under a stream of nitrogen. Thus, a modified resin (658 parts) having acid value of 26 was obtained, which was then dissolved in styrene (439 parts) containing hydroquinone (0.088 part). This solution is designated as "resin (H)".

EXAMPLE 7

The first stage reaction of a xylene-formaldehyde resin (100 parts) was carried out by adding maleic anhydride (27 parts) and water (10 parts), in the same manner as in Example 1. Then, propylene glycol (12 parts) was added to the resulting mixture and reacted therewith at 200° C. for 4 hours under a stream of nitrogen. Thus, a modified resin (126 parts) having acid value of 27 was obtained, which was then dissolved in styrene (84 parts) containing hydroquinone (0.017 part). This solution is designated as "resin (I)".

EXAMPLE 8

The first stage reaction of a mesitylene-formaldehyde resin (100 parts) was carried out by adding maleic anhydride (30 parts) and water (10 parts), in the same manner as in Example 1. Then, propylene glycol (18 parts) was added to the resulting mixture and reacted therewith at 200° C. for 4 hours under a stream of nitrogen. Thus, a modified resin (117 parts) having acid value of 25 was obtained, which was then dissolved in styrene (78 parts) containing hydroquinone (0.016 part). This solution is designated as "resin (J)".

EXAMPLE 9

The resins obtained in Comparative Examples 1 and 2 and Examples 1–8 were tested for curing characteristics. The results are shown in Table 1.

TABLE 1

| | Curing characteristics of resins | | | | | | | | | |
|---|---|---|---|---|---|---|---|---|---|---|
| | Resin | | | | | | | | | |
| | A | B | C | D | E | F | G | H | I | J |
| Gel time (min.) | 6.4 | 7.2 | 6.8 | 6.5 | 6.2 | 6.1 | 6.3 | 6.4 | 6.3 | 6.4 |
| Cure time (min.) | 9.9 | 11.0 | 9.6 | 7.9 | 8.6 | 8.5 | 7.6 | 7.8 | 9.2 | 9.2 |
| Peak exotherm temperature (°C.) | 200 | 198 | 219 | 220 | 215 | 218 | 257 | 225 | 210 | 215 |
| Reactivity (°C./sec) | 1.0 | 0.87 | 1.3 | 2.8 | 1.5 | 1.5 | 3.3 | 2.6 | 1.2 | 1.2 |

The above characteristics were determined according to JIS (Japanese Industrial Standards) K-6901. Curing agent: BPO (benzoyl peroxide) 1%, Test temperature: 80° C.

Gel time: Time (in minutes) for raising resin temperature from 65° C. to 85° C.

Cure time: Time (in minutes) for raising resin temperature from 65° C. to peak exotherm temperature $$\text{Reactivity (°C./sec)} = \frac{\text{(Peak exotherm temperature)}}{\text{(Cure time)} - \text{(Gel time)}}$$

Table 1 indicates that; while resin (A) of Comparative Example 1 exhibits a proper reactivity for a general FRP purpose resin, resin (B) of Comparative Example 2, which was prepared using merely an increased amount of maleic anhydride, is somewhat inferior in curing characteristics; in contrast, resins (C)–(J) of Examples 1 to 8, which were prepared with increased amounts of maleic anhydride in comparison with resin (A) of Comparative Example 2 and by adding a glycol, exhibit more improved reactivity and are satisfactory for use as molding compounds.

Subsequently, cast plates of each 3 mm thick were prepared from the resins of Comparative Examples 1 and 2 and of Examples 1–8 to which each 1% of benzoyl peroxide had been added, and properties of the plates were compared. The results are shown in Table 2.

TABLE 2

| | Properties of cast plates of resins | | | | | | | | | |
|---|---|---|---|---|---|---|---|---|---|---|
| | Resin | | | | | | | | | |
| | A | B | C | D | E | F | G | H | I | J |
| Shrinkage (%) | 7.0 | 6.8 | 7.4 | 8.2 | 7.8 | 8.0 | 8.5 | 7.6 | 7.2 | 7.4 |
| Barcol hardness (934-1) | 41 | 38 | 42 | 43 | 43 | 43 | 44 | 42 | 42 | 42 |
| HDT (°C.) | 74 | 65 | 100 | 125 | 120 | 120 | 130 | 115 | 80 | 90 |
| Flexural strength (Kg/mm$^2$) | 11 | 9.5 | 11 | 11.5 | 12 | 11 | 12 | 11 | 11.5 | 11 |
| Tensile strength (Kg/mm$^2$) | 8 | 6.4 | 7.5 | 8 | 8 | 8.1 | 8.1 | 7.4 | 7.6 | 7.7 |
| Elongation (%) | 22 | 25 | 2.2 | 2.1 | 2.0 | 2.1 | 2.0 | 2.1 | 2.1 | 2.1 |
| Boiling water absorption 100° C., 2 hrs (%) | 0.30 | 0.80 | 0.25 | 0.20 | 0.20 | 0.20 | 0.20 | 0.20 | 0.28 | 0.26 |

Curing conditions: Four-step heating; 60° C. - 16 hrs, 80° C. - 2 hrs, 100° C. - 2 hrs, and 120° C. - 2 hrs.
The above properties were determined according to JIS K-6911 and K-6919.

It can be seen from these results that, while resin (A) of Comparative Example 1 has a heat distortion temperature of 74° C., resin (B) of Comparative Example 2, which was synthesized using merely an increased amount of maleic anhydride exhibits a slightly lower heat distortion temperature and is considerably inferior in water resistance. On the other hand, resins (C)–(J) of Examples 1–8, synthesized by the process of this invention, wherein larger amounts of unsaturated polybasic acid such as maleic anhydride in comparison with resin (B) are used and moreover a glycol is added, exhibit heat distortion temperatures of 74° to 130° C. Thus, according to the process of this invention, it is possible to freely synthesize modified resins different in heat distortion temperature within the above range. Table 2 also indicates that the present process can also provide cured resins having improved water resistance.

What is claimed is:

1. A process for the preparation of a modified aromatic hydrocarbon resin which comprises reacting an aromatic hydrocarbon-formaldehyde resin with an unsaturated polybasic acid or an anhydride thereof in the presence or absence of water, while introducing steam into the reaction system removing by-produced formaldehyde out of the reaction system, and reacting the formed reaction product with at least one dihydroxy compound selected from the group consisting of (A) a glycol and (B) a hydroxy-terminated oligomer obtained by reacting a glycol with an unsaturated polybasic acid or an anhydride thereof.

2. A process according to claim 1, wherein the glycol is used in the combination with an unsaturated polybasic acid or anhydride thereof.

3. The process according to claim 1, wherein steam is introduced in an amount of 1 to 100 parts by weight per 100 parts by weight of the aromatic hydrocarbon-formaldehyde resin.

4. The process according to claim 1, wherein water is present in an amount of 50 parts or less by weight per 100 parts by weight of the aromatic hydrocarbon-formaldehyde resin.

5. The process according to claim 1, wherein the unsaturated polybasic acid or the anhydride thereof is used in an amount of 10 to 40 parts by weight per 100 parts by weight of the aromatic hydrocarbon-formaldehyde resin.

6. The process according to claim 1, wherein an equivalent ratio of hydroxy group containing in the dihydroxy compound to carboxyl group containing in the formed reaction product is 0.5 to 1.5.

7. The process according to claim 1, wherein the reaction of the formed reaction product with the dihydroxy compound is carried out at 180° to 250° C.

8. The process according to claim 1, wherein the unsaturated polybasic compound or anhydride thereof is maleic acid, maleic anhydride, fumaric acid or itaconic acid.

9. The process according to claim 1, wherein the saturated polybasic acid or anhydride thereof is adipic acid, sebacic acid, phthalic anhydride, isophthalic acid or terephthalic acid.

10. The process according to claim 1, wherein the glycol is ethylene glycol, propylene glycol, polyalkylene glycol, neopentyl glycol, 1,6-hexanediol or 2,2-bis(4-hydroxypropoxyphenyl)propane.

11. The process according to claim 1, wherein the aromatic hydrocarbon-formaldehyde resin is xylene-formaldehyde resin, mesitylene-formaldehyde resin, toluene-formaldehyde resin or benzene-formaldehyde resin.

12. The process according to claim 1, wherein the aromatic hydrocarbon-formaldehyde resin is reacted with the unsaturated polybasic acid or an anhydride thereof together with a saturated polybasic acid or an anhydride thereof.

* * * * *